2,773,908

SEPARATION AND PURIFICATION OF PHLOROGLUCINOL

William R. Cake, Glen Rock, N. J., assignor to Heyden Chemical Corporation, New York, N. Y., a corporation of Delaware No Drawing. Application August 7, 1952,
Serial No. 303,153

9 Claims. (Cl. 260—628)

The present invention relates to a method of separating phloroglucinol from a crude mixture of phloroglucinol and other hydroxy aromatic compounds.

Resorcinol is prepared commercially by fusing an alkali metal salt of benzene meta disulfonic acid with caustic alkali, for example, sodium hydroxide to form sodium resorcinate. The sodium resorcinate is then acidified with a mineral acid to form resorcinol. Crystalline resorcinol may be extracted from the crude reaction product by means of a suitable solvent. The literature indicates that phloroglucinol may be produced by a similar process in which the alkali metal salt of 1,3,5-benzene trisulfonic acid is fused with caustic alkali and the fused mass acidified with a mineral acid to form the trihydroxy compound. While these vague disclosures do exist in the literature, phloroglucinol is commercially produced by other methods.

It has been found that when the alkali metal salt of benzene trisulfonic acid is fused with a caustic alkali and the mass acidified with a mineral acid, there is obtained a water soluble product which a qualitative test indicates contains phloroglucinol. Phloroglucinol cannot be isolated from this crude product by known methods. A selective solvent cannot be used in the usual manner to separate the phloroglucinol. Apparently other reaction products are present in which the phloroglucinol is sufficiently soluble to prevent separation of the phloroglucinol by crystallization.

I have discovered a process for efficiently separating phloroglucinol in crystalline form from the crude phloroglucinol mixture extracted from a mass obtained by fusing the alkali metal salt of 1,3,5-benzene trisulfonic acid with caustic alkali and then acidifying the fused product with a mineral acid. The crude phloroglucinol extract is dissolved in an aromatic solvent, for example xylene, either the ortho, meta or para form, and then heated at a temperature of about 110° C. or higher until phloroglucinol crystals are formed. These crystals can be readily separated from the hot xylene solution by filtration. The filtrate contains other hydroxy phenols, and resorcinol can be crystallized out of the filtrate by cooling. Merely dissolving the crude phloroglucinol in xylene will not produce phloroglucinol crystals.

The following example illustrates the present invention, but the present invention is not limited to the particular conditions set forth except as clearly indicated in the specification and accompanying claims:

Example 38.5 grams (0.1 mole) of 1,3,5-benzene trisodium sulfonate and 122 grams (1.5 moles) of 49% sodium hydroxide were placed in a fusion pot along with 50 ml. of water. The mixture was fused for one hour under nitrogen with stirring at a temperature of about 320°–335° C. When the trisulfonic acid is the starting material, the acid first reacts to form the trisodium sulfonate which then fuses with the sodium hydroxide. The corresponding potassium compounds may be used. The fused mass was dissolved in water and acidified with a mineral acid, for example, hydrochloric or sulfuric acid, to a pH value of from 5 to 6 to convert the sodium phloroglucinate to phloroglucinol. The liquid was saturated with sodium chloride and then extracted with three 100 ml. portions of ethyl acetate. The extracts were dried, filtered and then evaporated to remove the ethyl acetate solvent. The crude phloroglucinol residue which weighed about 7 grams was dissolved in 150 ml. of xylene and boiled under reflux for 15 minutes. Upon boiling, crystals formed, and these crystals were separated by filtering the hot xylene solution. These crystals were dissolved in hot water and the solution cooled and the crystals separated by filtration. These last mentioned crystals were then washed with cold water and dried at 60° C. The dried crystals weighed 4.1 grams and had a melting point of 214°–216° C.

Apparently, boiling the crude phloroglucinol extract converts the phloroglucinol from dihydrate, $$C_6H_3(OH)_3 \cdot 2H_2O$$

to the anhydrous form, $C_6H_3(OH)_3$. While the dihydrate is soluble in xylene, the anhydrous form is not soluble and separates out as crystals. Thus, the phloroglucinol is converted from a soluble to an insoluble form.

Other aromatic solvents may be used. The aromatic solvent must be a solvent for the crude phloroglucinol extract including being a solvent for phloroglucinol dihydrate and the other hydroxy phenols such as resorcinol which are present in the mixture. The solvent also must have a boiling point at least as high as about 110° C. so that the solution can be heated to a temperature at or above 110° C. to convert the dihydrate to the anhydrous form. Accordingly, the solvent when hot must be substantially a non-solvent for anhydrous phloroglucinol and a solvent for resorcinol and the other hydroxy phenols. The term, non-solvent, is used to indicate that less than about 0.5 gram is soluble in 100 grams of hot solvent. The term, solvent, is used to indicate that at least 1 gram is soluble in 100 grams of the hot solvent. As the crude mixture contains a relatively large quantity of phloroglucinol and a relatively small quantity of resorcinol, the solvent may be a relatively weak solvent for resorcinol and can dissolve a slight amount of anhydrous phloroglucinol. Regardless of whether or not the present theory is correct, it has been found that aromatic solvents meeting the above conditions are satisfactory.

Other solvents which, for example, may be used for separating phloroglucinal from the crude mixture including other hydroxy phenols, for example, resorcinol, hydroquinone and catechol, are toluene, monochlorobenzene, ethyl benzene, cumene, mesitylene, dichlorobenzene, diethyl benzene and p-cymene. Toluene represents a relatively low boiling solvent, boiling at about 110° C. The ortho dichlorobenzene represents a relatively higher boiling solvent, boiling at 179° C. Where the solvent boils at a relatively high temperature, it is not necessary to heat the solvent to the boiling point to convert the phloroglucinol to the anhydrous form and this may be undesirable as there is a tendency for the resorcinol to break down at the higher temperatures. Preferably, conversion of the phloroglucinol to the anhydrous form is obtained by heating the solution to a temperature of about from 110°–140° C.

I also have found that after the phloroglucinol crystals have been separated from the hot xylene solution, resorcinol crystals will precipitate out of the solution upon cooling. The resorcinol crystals can be separated by filtration. Thus, both phloroglucinol and resorcinol can be separated from the crude mixture.

I claim:
1. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in a solvent selected from the group consisting of toluene, xylene, monochlorobenzene, ethyl benzene, cumene, mesitylene, dichlorobenzene, diethylbenzene, and p-cymene, maintaining the resulting solution at a temperature above 110° C. to convert the phloroglucinol dihydrate to insoluble anhydrous phloroglucinol whereby anhydrous phloroglucinol crystals are formed, and then separating the crystals from the hot solution containing the resorcinol dissolved in the solvent.

2. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in xylene, maintaining the resulting solution at a temperature above 110° C. to convert the phloroglucinol dihydrate to insoluble anhydrous phloroglucinol whereby anhydrous phloroglucinol crystals are formed, and then separating the crystals from the hot solution containing the resorcinol dissolved in the xylene.

3. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in toluene maintaining the resulting solution at a temperature above 110° C. to convert the phloroglucinol dihydrate to insoluble anhydrous phloroglucinol whereby anhydrous phloroglucinol crystals are formed, and then separating the crystals from the hot solution containing resorcinol dissolved in the toluene.

4. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in monochlorobenzene maintaining the resulting solution at a temperature above 110° C. to convert the phloroglucinol dihydrate to insoluble anhydrous phloroglucinol whereby anhydrous phloroglucinol crystals are formed, and then separating the crystals from the hot solution containing resorcinol dissolved in the monochlorobenzene.

5. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in ethyl benzene maintaining the resulting solution at a temperature above 110° C. to convert the phloroglucinol dihydrate to insoluble anhydrous phloroglucinol whereby anhydrous phloroglucinol crystals are formed, and then separating the crystals from the hot solution containing resorcinol dissolved in ethyl benzene.

6. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in dichlorobenzene maintaining the resulting solution at a temperature above 110° C. to convert the phloroglucinol dihydrate to insoluble anhydrous phloroglucinol whereby anhydrous phloroglucinol crystals are formed, and then separating the crystals from the hot solution containing resorcinol dissolved in dichlorobenzene.

7. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in a solvent selected from the group consisting of toluene, xylene, monochlorobenzene, ethyl benzene, cumene, mesitylene, dichlorobenzene, diethylbenzene, and p-cymene, maintaining the resulting solution at a temperature of from about 110° C. to 140° C. to convert the phloroglucinol dihydrate to insoluble anhydrous phloroglucinol whereby anhydrous phloroglucinol crystals are formed, and then separating the crystals from the hot solution containing resorcinol dissolved in the solvent.

8. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in xylene, maintaining the resulting solution at a temperature of from about 110° C. to 140° C. to convert the phloroglucinol dihydrate to insoluble anhydrous phloroglucinol whereby anhydrous phloroglucinol crystals are formed, and then separating the crystals from the hot solution containing resorcinol dissolved in the xylene.

9. The process of separating phloroglucinol from water-soluble crude phloroglucinol dihydrate containing other hydroxy phenols including resorcinol extracted from a mass obtained by fusing 1,3,5-benzene trialkali metal sulfonate with caustic alkali and then acidifying the fused product with a mineral acid, the process comprising dissolving the crude phloroglucinol dihydrate in xylene, maintaining the resulting solution at a temperature of about from 110° C. to 140° C. to convert the phloroglucinol dihydrate to insoluble anhydrous phloroglucinol whereby anhydrous phloroglucinol crystals are formed, then separating the phloroglucinol crystals from the hot solution, and then cooling the solution to precipitate resorcinol crystals and separating the last mentioned crystals.

References Cited in the file of this patent

UNITED STATES PATENTS

| | | |
|---|---|---|
| 1,912,628 | Elliott | June 6, 1933 |
| 2,579,122 | Oppenheimer et al. | Dec. 18, 1951 |

OTHER REFERENCES

Barth et al.: Berichte, vol. 12, pp. 417–423 (1879).